United States Patent
Chiang (10) Patent No.: US 10,308,298 B2
(45) Date of Patent: Jun. 4, 2019

(54) TRACK SHOE PAD STRUCTURE ASSEMBLY

(71) Applicant: EVERPADS CO., LTD., Taichung (TW)

(72) Inventor: Chun-Li Chiang, Taichung (TW)

(73) Assignee: EVERPADS CO., LTD., Taichung (TW)

( * ) Notice: Subject to any disclaimer, the term of this patent is extended or adjusted under 35 U.S.C. 154(b) by 0 days.

(21) Appl. No.: 15/470,890

(22) Filed: Mar. 27, 2017

(65) Prior Publication Data
US 2017/0305484 A1    Oct. 26, 2017

(30) Foreign Application Priority Data

Apr. 20, 2016    (CN) .................. 2016 2 0333239 U
Dec. 6, 2016    (CN) .................. 2016 2 1330412 U (51) Int. Cl.
    *B62D 55/26*      (2006.01)
    *B62D 55/28*      (2006.01)
    *B62D 55/275*     (2006.01)

(52) U.S. Cl.
    CPC ........... *B62D 55/26* (2013.01); *B62D 55/275* (2013.01); *B62D 55/28* (2013.01)

(58) Field of Classification Search
    CPC ....... B62D 55/26; B62D 55/28; B62D 55/275
    USPC ...................................................... 305/198
    See application file for complete search history.

(56) References Cited

U.S. PATENT DOCUMENTS

| | | | |
|---|---|---|---|
| 7,673,951 B2 * | 3/2010 | Chiang ................ | B62D 55/275 |
| | | | 305/162 |
| 8,011,739 B2 * | 9/2011 | Busley .................. | B62D 55/28 |
| | | | 305/189 |
| 2008/0061626 A1 * | 3/2008 | Busley ................ | B62D 55/275 |
| | | | 305/46 |

FOREIGN PATENT DOCUMENTS

| | | |
|---|---|---|
| CN | 203032786 U | 7/2013 |
| CN | 204713230 U | 10/2015 |
| DE | 102008035182 A1 | 2/2010 |
| EP | 2767460 A1 | 8/2014 |
| JP | 08053080 A * | 2/1996 |

* cited by examiner

*Primary Examiner* — Kip T Kotter
(74) *Attorney, Agent, or Firm* — CKC & Partners Co., LLC (57) ABSTRACT

A track shoe pad structure assembly is connected to a track chain of a caterpillar vehicle. The track shoe pad structure assembly includes a track shoe pad, a reinforcing unit and an elastic element. The track shoe pad is for connecting to the track chain and includes a notch. One side of the reinforcing unit is detachably connected to the notch, and the reinforcing unit includes a base frame disposed on the track shoe pad and at least one supporting rib disposed on one side of the base frame which is located away from the track shoe pad. The elastic element is detachably connected to the other side of the reinforcing unit, and the elastic element includes at least one recessed trough for containing the supporting rib.

1 Claim, 13 Drawing Sheets

TRACK SHOE PAD STRUCTURE ASSEMBLY

RELATED APPLICATIONS

This application claims priority to China Application Serial Number 201620333239.5, filed Apr. 20, 2016, and China Application Serial Number 201621330412.2, filed Dec. 6, 2016, which are herein incorporated by reference.

BACKGROUND

Technical Field

The present disclosure relates to a track shoe pad structure assembly. More particularly, the present disclosure relates to a track shoe pad structure assembly applied to heavy caterpillar vehicles.

Description of Related Art

Heavy caterpillar vehicles which use tracks for movement such as excavators, pavement machines, cement or asphalt pavers and exploration and drilling machines have been widely used on various engineering operations in modern society, wherein tracks of the heavy caterpillar vehicles can be further divided into metal track and rubber track. The metal track can increase the friction between the track and the ground by deposing a patterned grain on track shoe pads on the track chain to facilitate the processing of the heavy caterpillar machines. However, the metal track will damage the pavement and a big noise will be made because of the direct contact of the track and pavement during the processing of the heavy caterpillar vehicle. In order to prevent the damage of the road and reduce the noise caused by the metal track, the rubber track appears on the market.

The rubber track includes a track shoe protection structure on the conventional metal track shoe pad, and one conventional track shoe protection structure includes a baseplate, a reinforcing member and a plastic block. The reinforcing member is disposed on the plastic block with elasticity for increasing the intensity of the combination of the plastic block, and then the plastic block, the reinforcing member and the baseplate are connected to the track chain by a screw member so as to finish the combination of the rubber track. When the track shoe protection structure is stably assembled on the track chain, the baseplate will directly contact with the track chain of the heavy caterpillar vehicle, and the plastic block will directly contact with the pavement. By the foregoing combination, the track shoe protection structure can prevent the directly contact of the pavement with the baseplate and the damage of the road, and the track shoe protection structure can further absorb the noise makes from the processing of the heavy caterpillar vehicle so as to facilitate a smooth and rapid movement of the heavy caterpillar vehicles and substantially increase the serve life of the track chain.

However, the rubber blocks of the conventional rubber track should be replaced frequently after a period of serving time because of the abrasion thereof. The track of the heavy caterpillar vehicles such as excavators, cement or asphalt pavers, and pavement machines are installed hundreds of track shoe protection structures on the track chain, when one or few track shoe protection structures are abraded or damaged, it is necessary to proceed maintenance of the entirety of the track chain. It is laborious and time-consuming to replace the track shoe protection structure one by one or replace all at the same time and will greatly affect the efficiency of the maintenance and replacement of the heavy caterpillar vehicles, and will further affect the subsequent engineering operations.

In order to solve the foregoing problems, the baseplate, the reinforcing member and the plastic block of another conventional track shoe protection structure are non-detachably disposed to each other so as to improve the intensity of the track shoe protection structure. However, when the plastic blocks are abraded and need to be replace, the baseplate should be replaced with the plastic block and the reinforcing member, so that the cost of the replacement of the conventional track shoe protection structures remains high.

Figure 1:
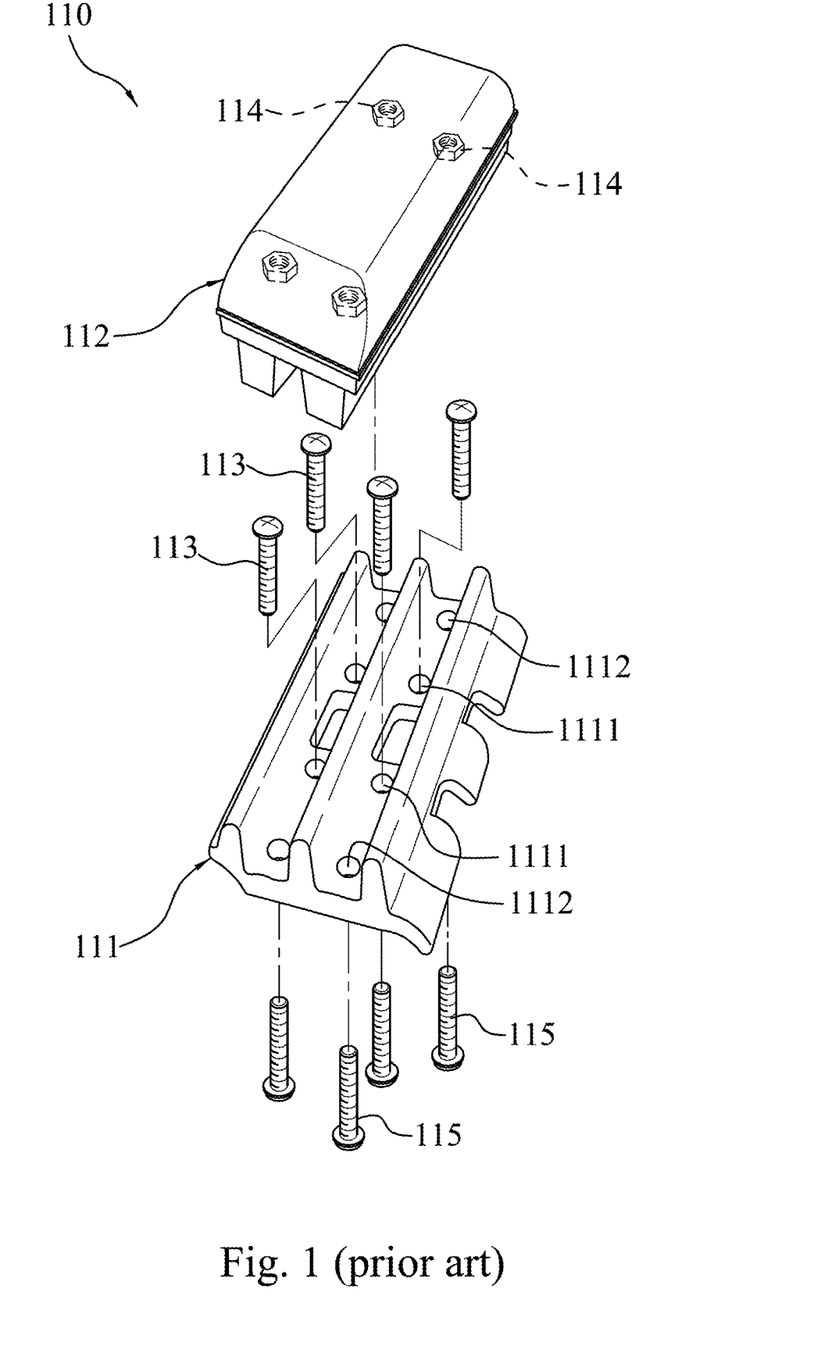
FIG. 1 is a schematic view of a conventional track shoe protection structure.

In order to solve the foregoing problems, a conventional track shoe protection structure 110 with detachable baseplate and plastic block is developed. In FIG. 1 is a schematic view of the conventional track shoe protection structure 110. The conventional track shoe protection structure 110 has a baseplate 111, a plastic block 112, a plurality of first screws 113, a plurality of screw nuts 114 and a plurality of second screws 115.

According to the combination method of the conventional track shoe protection structure 110, the first screws 113 are passed through the first perforation 1111 of the baseplate 111 and then connected to the track chain (not shown on FIG. 1). When the baseplate 111 is disposed on the track chain, the second screws 115 is passed through the second perforation 1112 of the baseplate 111 and the track chain, and then the second screws 115 is connected to the screw nuts 114 within the plastic block 112 in order to combine the plastic block 112 and the baseplate 111.

Although the connection method of the conventional track shoe protection structure 110 can solve the foregoing problems, some sands and stone chips are easy to enter the gap between the baseplate 111 and the plastic block 112 during processing. Because of the hardness of the plastic block 112 is lower than the sand and the stone chips, the plastic block 112 is easily abraded by the sand and the stone chips and further impacting the combination intensity between the plastic block 112 and the baseplate 111.

Figure 2A:
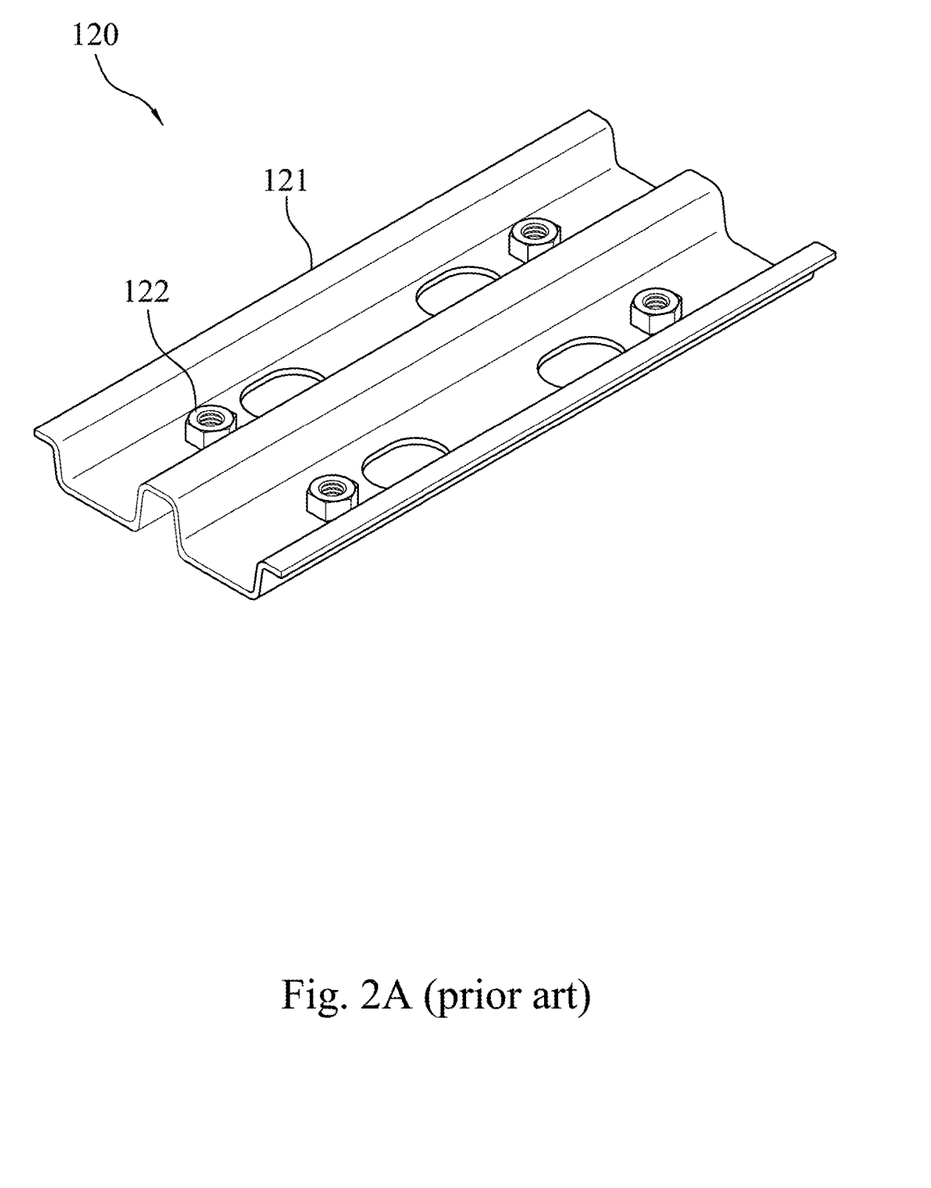
FIG. 2A is a schematic view of a conventional reinforcing member.

Besides, another improved reinforcing member 120 of the track shoe protection structure is proved. FIG. 2A is a schematic view of a conventional reinforcing member 120, wherein the conventional reinforcing member 120 includes a basal stand 121, a plurality of openings (not shown in FIG. 2A) and a plurality of screw nuts 122. The openings are arranged equidistantly on the basal stand 121, and each of the screw nuts 122 is welded to connect on the opening respectively so as to pass a screw member (not shown in FIG. 2A) through the opening and be connected to the screw nut 122. The conventional reinforcing member 120 has only one intensity power in single direction, and the intensity of the reinforcing member 120 is not enough for the heavy caterpillar vehicle which bears heavy burdens.

Figure 2B:
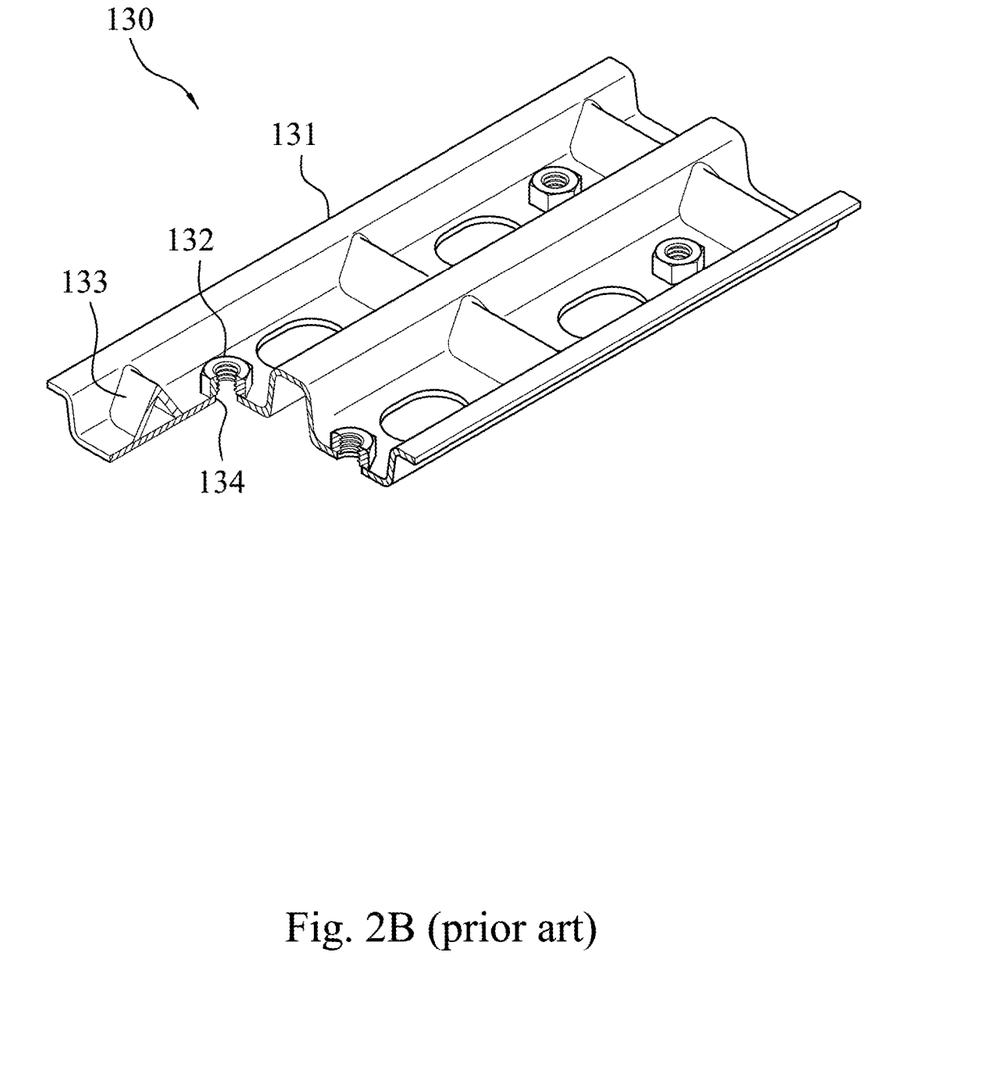
FIG. 2B is a cross-sectional view of the corner point of the second conventional reinforcing member.

In order to solve the foregoing problems of reinforcing member 120, another reinforcing member 130 is provided. FIG. 2B is a cross-sectional view of the corner point of the conventional reinforcing member 130, wherein the reinforcing member 130 contains not only basal stand 131, a plurality of openings 134 and a plurality of screw nuts 132, but also contains at least one reinforcing portion 133. The reinforcing portion 133 is a hollow frame structure and is welded to connect on the basal stand 131 so as to increase an intensity power in another direction. However, owing to the reinforcing portion 133 is a hollow frame structure, the gas contained within the reinforcing portion 133 will get into the plastic block during the founding solidification step of the plastic block. The gas-bubble-contained plastic block is easy to be cracked during the procession of heavy caterpillar vehicles, and then decrease the sever life of the track shoe protection structure. Besides, the screw nut 122 and the screw nut 132 are welded to connect to the basal stand 121 and 131 on the reinforcing member 120 and the reinforcing member 130 respectively, it is easy to be crooked or less accuracy because of the negligence during the welding process, and further increase the difficulty for assembling the track shoe protection structure.

According to the aforementioned problems, how to improve the combination method of the baseplate, reinforcing member and the plastic block of the track shoe protection structure and further reinforce combination stability in order to reduce the abrasion and replaced rate of the track shoe protection structure has become the major developmental destination. Besides, how to improve the structural disposing of the reinforcing member, reinforce the intensity of the track shoe protection structure and increase the combination accuracy, and how to reduce the manufacturing cost has become a major aim of the people in related business.

SUMMARY

According to one aspect of the present disclosure, a track shoe pad structure assembly is connected to a track chain of a caterpillar vehicle. The track shoe pad structure assembly includes a track shoe pad, a reinforcing unit and an elastic element. The track shoe pad is for connecting to the track chain, and the track shoe pad includes a notch, wherein the notch includes a notch bottom and two notch walls, the two notch walls and the notch bottom are integrally connected, and the two notch walls are opposite to each other. One side of the reinforcing unit is detachably connected to the notch, and the reinforcing unit includes a base frame and at least one supporting rib. The base frame is disposed on the track shoe pad and includes a recessed portion and two shoulder portions, wherein the recessed portion is correspondingly connected to the notch bottom, the two shoulder portions and the recessed portion are integrally connected, and the two shoulder portions are opposite to each other and against the two notch walls, respectively. The supporting rib is disposed on one side of the base frame which is located away from the track shoe pad, and the supporting rib is located among the recessed portion and the two shoulder portions. The elastic element is detachably connected to the other side of the reinforcing unit, and the elastic element includes at least one recessed trough for containing the supporting rib.

According to another aspect of the present disclosure, the track shoe pad structure assembly is connected to a track chain of a caterpillar vehicle by a screw member. The track shoe pad structure assembly includes a track shoe pad, a reinforcing unit and an elastic element. The track shoe pad is for connecting to the track chain and includes at least one aperture for passing the screw member. The track shoe pad includes a notch, wherein the notch includes a notch bottom and two notch walls, and the two notch walls and the notch bottom are integrally connected and the two notch walls are opposite to each other. The reinforcing unit includes a base frame and at least one solid member. The base frame is disposed on the track shoe pad and includes at least one recessed portion and two shoulder portions, wherein the recessed portion includes at least one opening hole for passing the screw member. The opening holes are corresponding to the apertures respectively, and the two shoulder portions are opposite to each other and against to the two notch walls, respectively. The solid member is disposed on one side of the base frame which is located away from the track shoe pad. The solid member includes a blind screw hole which is disposed within the solid member, and the blind screw hole is corresponding to the aperture of the track shoe pad for connecting to the screw member. The elastic element is detachably connected to the other side of the reinforcing unit, and the elastic element includes at least one recessed trough for containing the solid member.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 3:
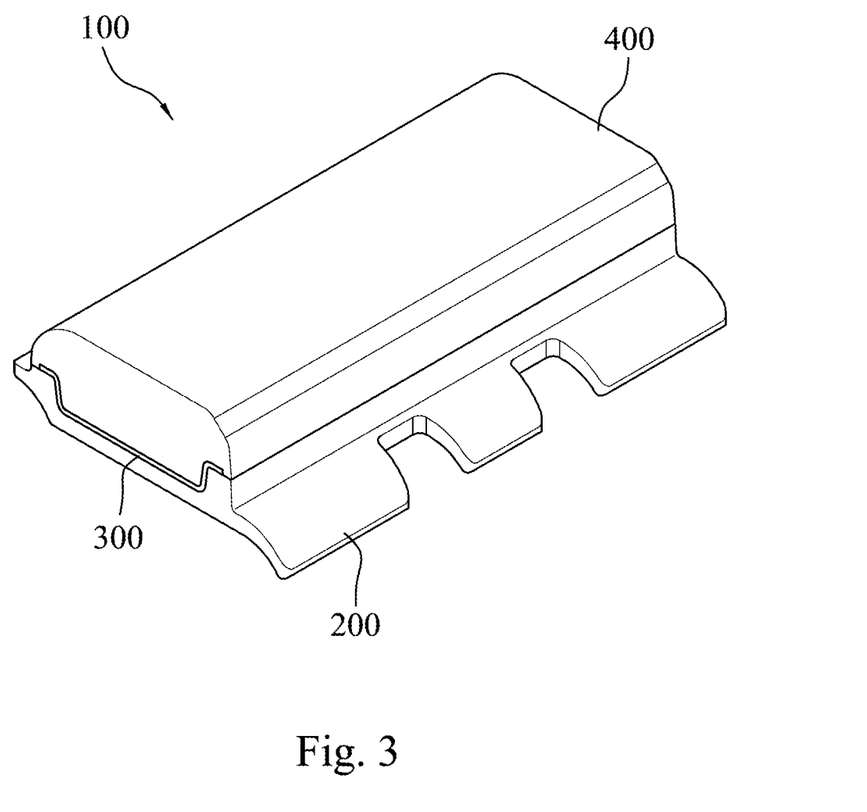
FIG. 3 is a schematic view of a track shoe pad structure assembly according to one example of one embodiment of the present disclosure.
Figure 4A:
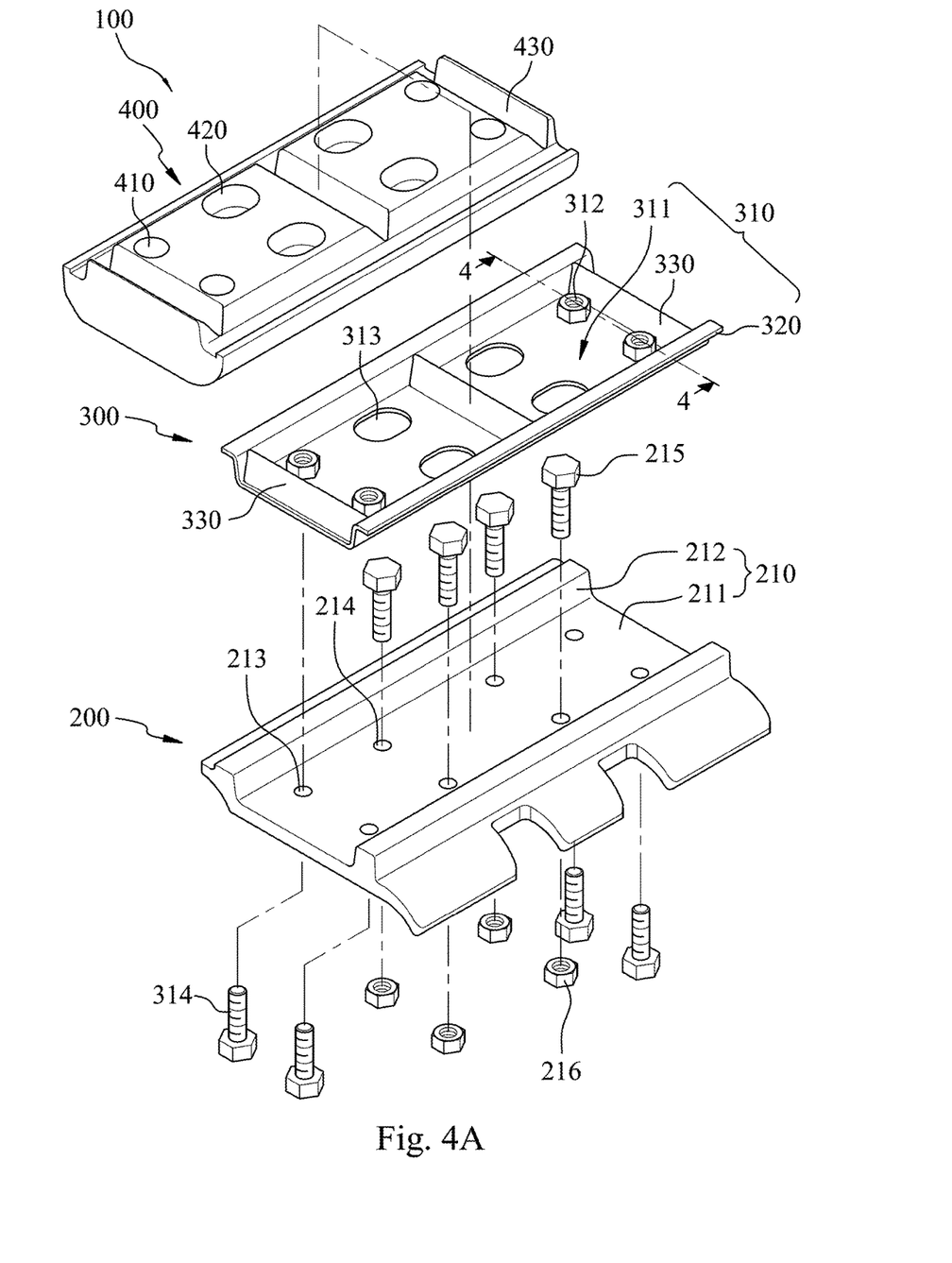
FIG. 4A is an exploded schematic view of the track shoe pad structure assembly of FIG. 3.
Figure 4B:
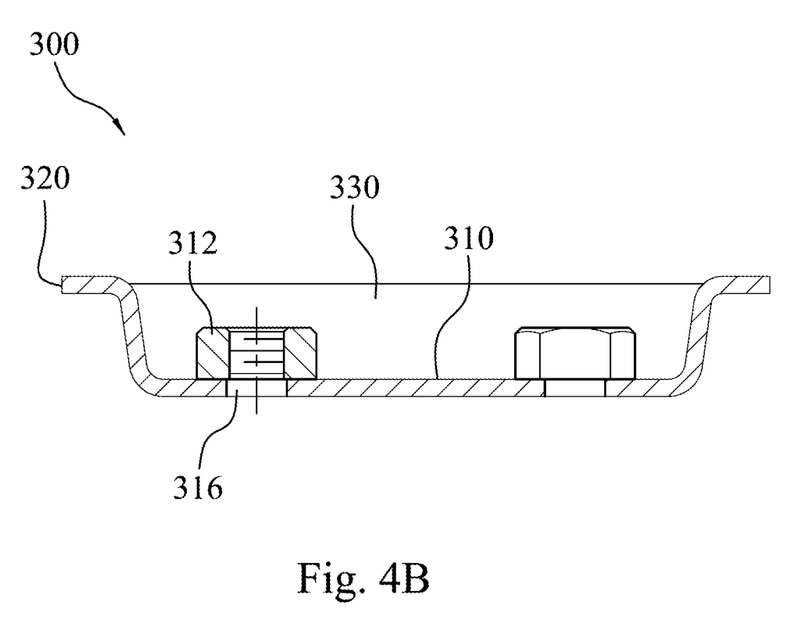
FIG. 4B is a cross-sectional view along the sectional line 4-4 of a reinforcing unit of the track shoe pad structure assembly of FIG. 4A.

FIG. 3 is a schematic view of a track shoe pad structure assembly 100 according to one example of one embodiment of the present disclosure. FIG. 4A is an exploded view of the track shoe pad structure assembly 100 of FIG. 3. FIG. 4B is a cross-sectional view along the sectional line 4-4 of the reinforcing unit 300 of the track shoe pad structure assembly 100 of FIG. 4A.

The track shoe pad structure assembly 100 which is connected to a track chain of a caterpillar vehicle (not shown in the figures) and includes a track shoe pad 200, a reinforcing unit 300 and an elastic element 400. The track shoe pad 200 can be made of metals or other high intensity materials. The track shoe pad 200 includes a notch 210, wherein the notch 210 includes one notch bottom 211 and two notch walls 212. The notch walls 212 and the notch bottom 211 are integrally connected, and the two notch walls 212 are opposite to each other.

The reinforcing unit 300 includes one base frame 310 and at least one supporting rib 330, in detail, the reinforcing unit 300 includes three supporting ribs 330 in the example of FIGS. 3-4B. The base frame 310 can be made of metals or other high intensity materials, and the base frame 310 includes one recessed portion 311 and two shoulder portions 320, wherein the recessed portion 311 is correspondingly connected to the notch bottom 211 of the track shoe pad 200. The two shoulder portions 320 and the recessed portion 311 are integrally connected and the two shoulder portions 320 are opposite to each other, and the two shoulder portions 320 are against the two notch walls 212, respectively. By the foregoing corresponding relationship, the reinforcing unit 300 can be embedded to the track shoe pad 200 so as to increase the stability of the combination of the reinforcing unit 300 and the track shoe pad 200. The supporting ribs 330 are disposed on one side of the base frame 310 which is located away from the track shoe pad 200 and are disposed among the recessed portion 311 and the two shoulder portions 320. The shape of supporting rib 330 can be a triangular prism, a rectangular prism, a semi-cylinder or a wave-shaped prism. The supporting rib 330 with different shapes can reinforce and regular the supporting force from different directions, so that the intensity of the reinforcing unit 300 can be increased.

The elastic element 400 can be made of rubber or other elastic materials, and the elastic element 400 is detachably connected to the other side of the reinforcing unit 300 which is corresponding to the track shoe pad 200. The elastic element 400 can be connected to the reinforcing unit 300 during the founding solidification step of the elastic element 400. The protection of the reinforcing unit 300 can prevent sands or stone chips entering the gap between the track shoe pad 200 and the elastic element 400 which may abrade the elastic element 400, and the stability of the combination between the elastic element 400 and the track shoe pad 200 will not be affected.

The notch bottom 211 of the track shoe pad 200 includes four first through holes 213, four second through holes 214 and four first connecting members 215, wherein the first connecting members 215 respectively corresponds to the second through holes 214 for connecting to the track chain of the caterpillar vehicle. In the example of FIGS. 3-4B, each of the first connecting members 215 is a screw stem. Moreover, the recessed portion 311 includes four third through holes 316 (shown in FIG. 4B), four fourth through holes 313, four second connecting members 312, and three supporting ribs 330, wherein each of the third through holes 316 respectively corresponds to the first through holes 213, each of the fourth through holes 313 respectively corresponds to the second through holes 214, each of the second connecting members 312 respectively corresponds to the third through holes 316, and the three supporting ribs 330 are arranged equidistantly among the recessed portion 311 and the two shoulder portions 320 respectively.

The elastic element 400 includes four first concave holes 410, four second concave holes 420 and three recessed troughs 430, and the recessed troughs 430 are for containing three supporting ribs 330, respectively. Each of the first concave holes 410 of the elastic element 400 respectively corresponds to the third through holes 316. When the reinforcing unit 300 is connected to the elastic element 400, each of the first concave holes 410 is for containing the second connecting member 312 correspondingly, and each of the second concave holes 420 is respectively corresponding to the fourth through holes 313. Moreover, when the track shoe pad 200, the reinforcing unit 300 and the elastic element 400 are connected together, each of the second concave holes 420 is for containing the first connecting members 215 respectively, and whereby the contacted surface of the reinforcing unit 300 with the elastic member 400 can be tightly fitted.

The embedding combination of the three recessed troughs 430 and the three supporting ribs 330 can reduce the lateral shake of the elastic element 400 during the processing of the caterpillar vehicle. Simultaneously, the three supporting ribs 330 can effectively reinforce the supporting ability against the fractures from different directions and thereby prevent the reinforcing unit 300 from deforming and damaging.

In the example of FIGS. 3-4B, the second connecting member 312 is a screw nut, which is welded to connect on the third through hole 316 of the recessed portion 311, so that the stability of the integral combination can be increased. In the corresponding relationship, the first through hole 213, the third through hole 316, the second connecting member 312 and the first concave hole 410 are corresponding to each other and are approximately coaxial; the second through hole 214, the first connecting member 215, fourth through hole 313 and the second concave hole 420 are corresponding to each other and are approximately coaxial. When the track shoe pad structure assembly 100 is connected to the track chain, the first connecting member 215 should be passed through the second through hole 214 of the track shoe pad 200 and the track chain sequentially, and then the first connecting member 215 is connected with a first screw nut 216 so as to connect the track shoe pad 200 and the track chain. At the moment, a first screw stem 314 can be passed through the first through hole 213 of the track shoe pad 200 and the third through hole 316 of the reinforcing unit 300, and then connected with the second connecting member 312 so as to connect the elastic element 400, the reinforcing unit 300 and the track shoe pad 200 together. By the detachable connection of the track shoe pad 200 and the elastic element 400, the track shoe pad 200 has no need to be replaced with the elastic element 400, thus the costs of the replacement can be reduced.

Figure 5A:
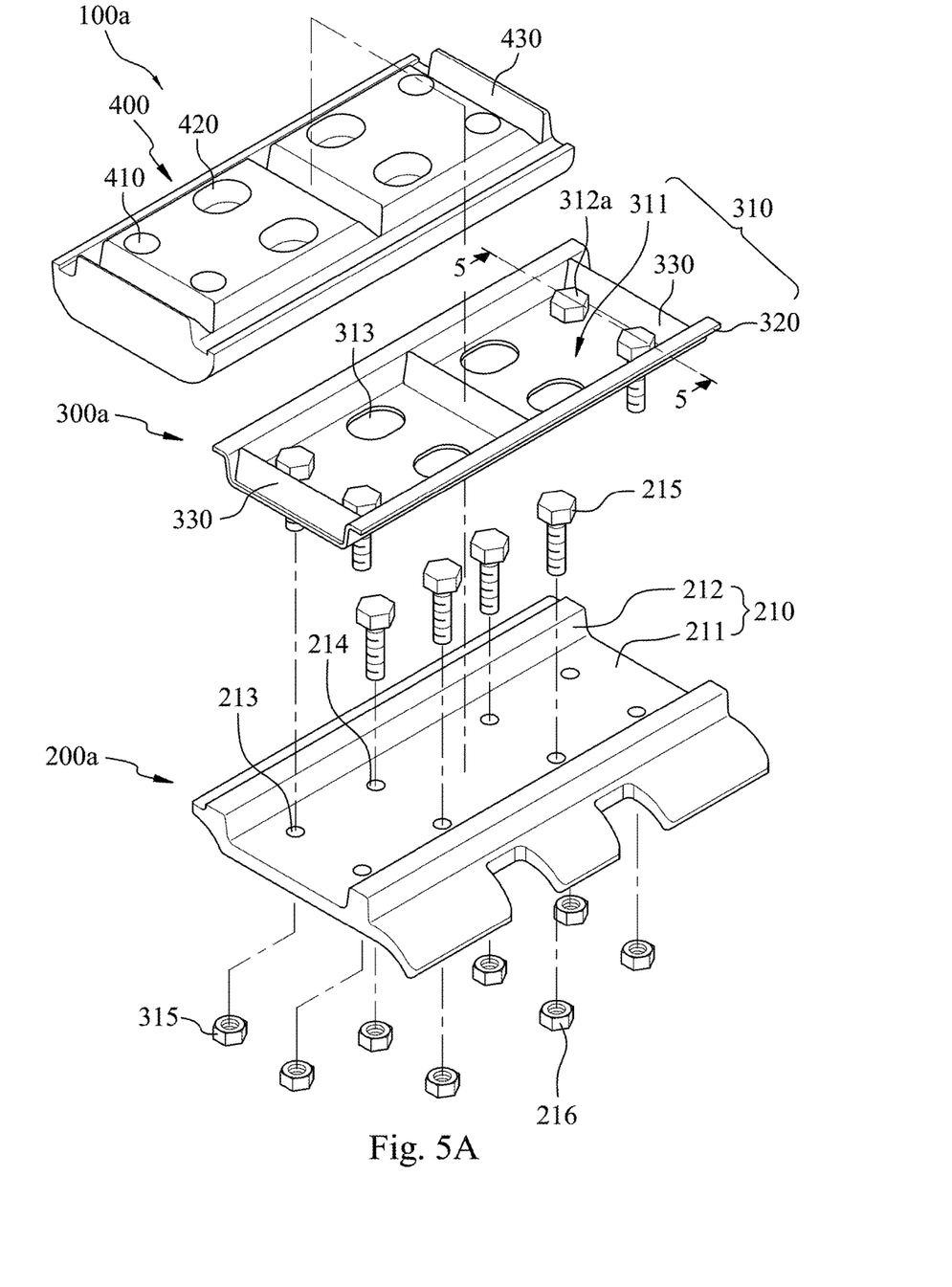
FIG. 5A is an exploded view of the track shoe pad structure assembly of another example of one embodiment.
Figure 5B:
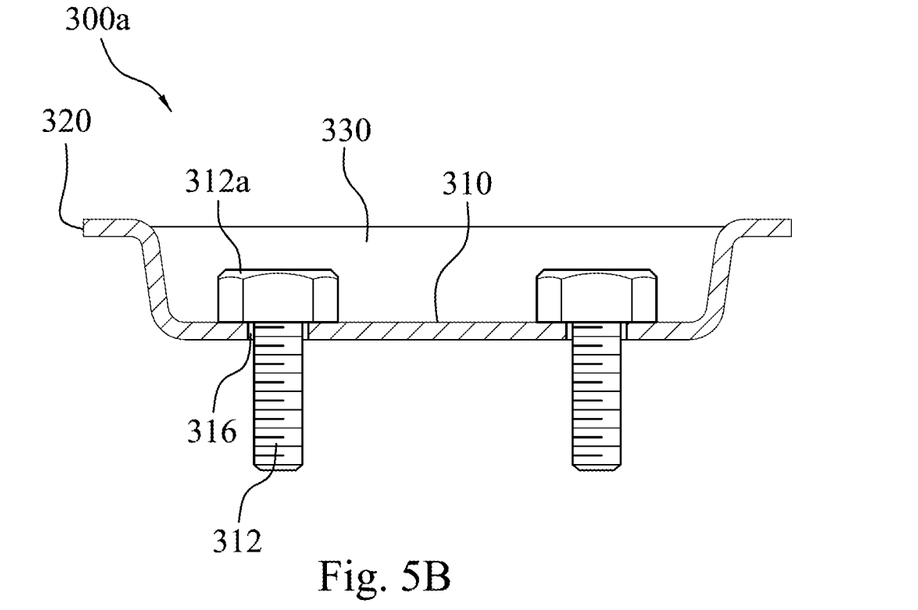
FIG. 5B is a cross-sectional view along the sectional line 5-5 of the reinforcing unit of the track shoe pad structure assembly of FIG. 5A.

FIG. 5A is an exploded schematic view of the track shoe pad structure assembly 100a according to another example of the aforementioned embodiment, and FIG. 5B is a cross-sectional view along with the section line 5-5 of the reinforcing unit 300a of the track shoe pad structure assembly 100a according to another example in FIG. 5A. In FIGS. 5A and 5B, the track shoe pad structure assembly 100a includes a track shoe pad 200a, a reinforcing unit 300a and an elastic element 400.

The second connecting member 312a is a screw stem. In the corresponding relationship, the first through hole 213, the third through hole 316 (shown in FIG. 5B), the second connecting member 312a and the first concave hole 410 are corresponding to each other and are approximately coaxial; the second through hole 214, the first connecting member 215, the fourth through hole 313 and the second concave hole 420 are corresponding to each other and are approximately coaxial. When the track shoe pad structure assembly 100a is connected to the track chain, the first connecting member 215 is passed through the second through hole 214 of the track shoe pad 200a and the track chain sequentially, and then the first connecting member 215 is connected with a first screw nut 216 so as to connect the track shoe pad 200a and the track chain. The elastic element 400 can be connected to the reinforcing unit 300*a* during the founding solidification step. In the case where the reinforcing unit 300*a* and the elastic element 400 are connected with each other, the second connecting member 312*a* can passed through the third through hole 316 of the reinforcing unit 300*a* and the first through hole 213 of the track shoe pad 200*a*, and then the second connecting member 312*a* is connected with a second screw nut 315 so as to assemble the track shoe pad structure assembly 100*a*. By the detachable connection of the track shoe pad 200*a* and the elastic element 400, the track shoe pad 200*a* has no need to be replaced with the elastic element 400, thus the costs of the replacement can be reduced. In the example of 5A-5B, the track shoe pad structure assembly 100*a* also includes three supporting ribs 330 and three recessed troughs 430. The embedding combination of the three recessed troughs 430 and the three supporting ribs 330 can reduce the lateral shake during the processing of the caterpillar vehicle, so that the reinforcing unit 300*a* can effectively protect the elastic element 400. Simultaneously, three supporting ribs 330 can effectively reinforce the supporting ability of the reinforcing unit 300*a* and thereby can prevent the reinforcing unit 300*a* from deforming and damaging.

Figure 6A:
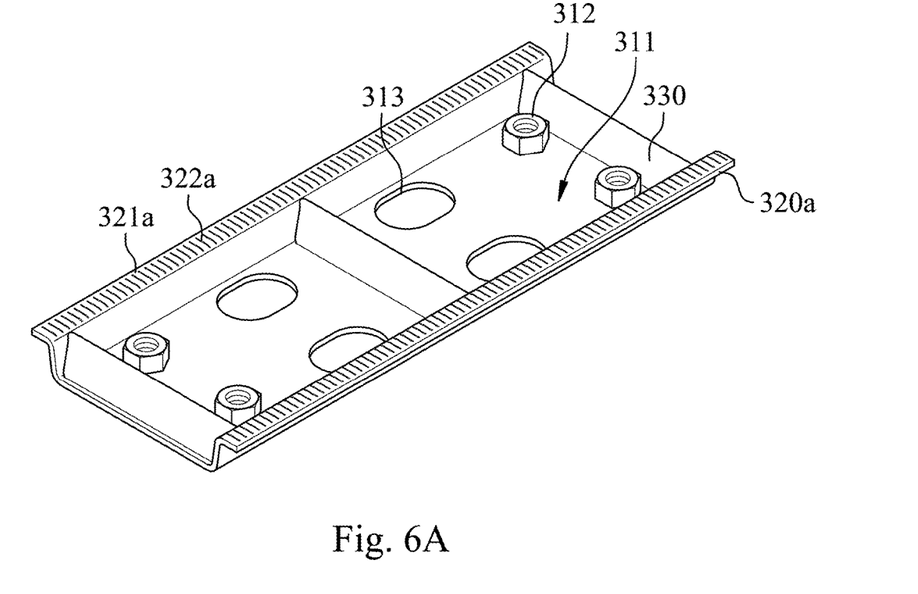
FIG. 6A is a schematic view of one example of the grain on a surface of the shoulder portion of one embodiment of the present disclosure.
Figure 6B:
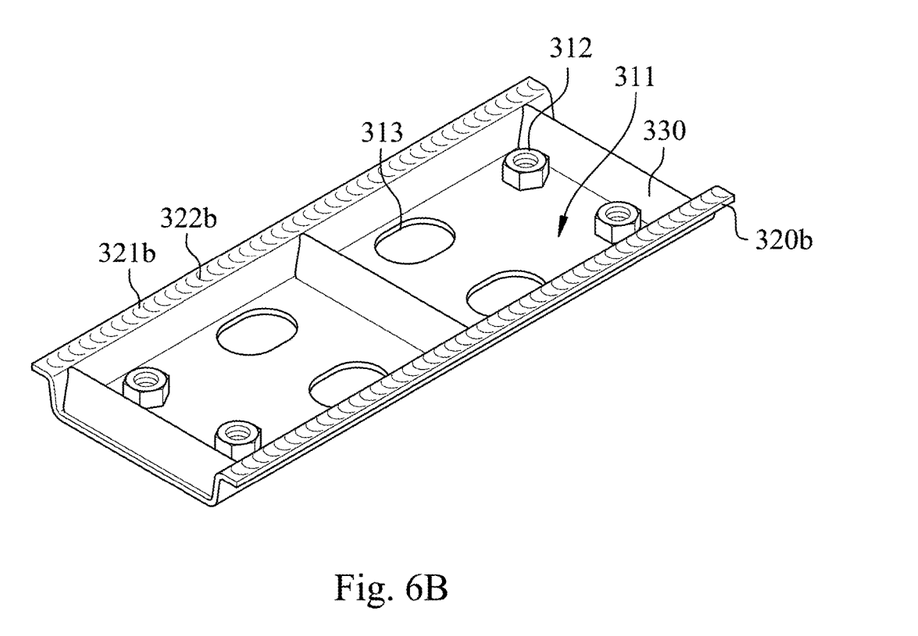
FIG. 6B is a schematic view of another example of the grain on the surface of the shoulder portion of one embodiment of the present disclosure.
Figure 6C:
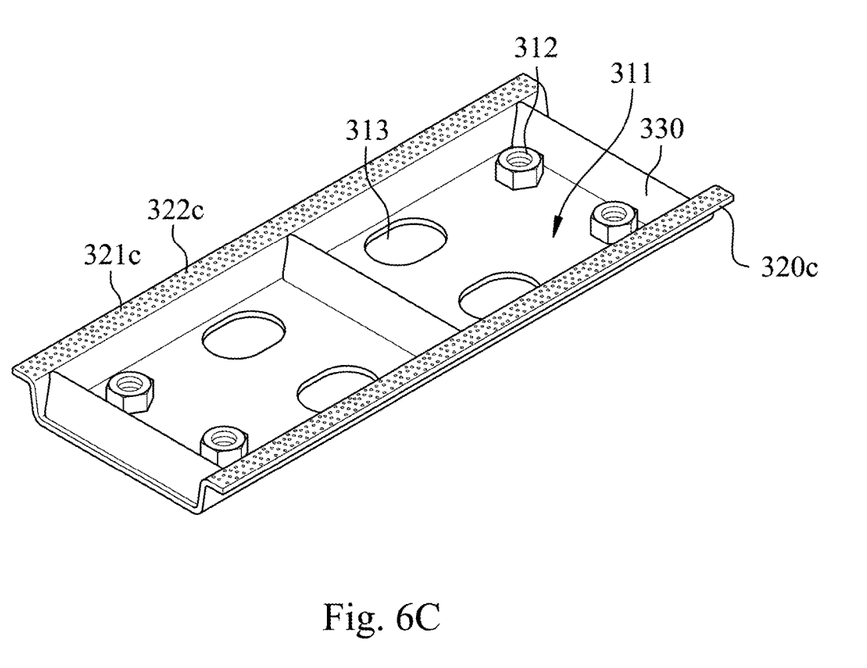
FIG. 6C is a schematic view of another example of the grain on the surface of the shoulder portion of one embodiment of the present disclosure.

FIG. 6A is a schematic view of one example of the grain 322*a* on a surface 321*a* of a shoulder portion 320*a* of one embodiment of the present disclosure. FIG. 6B is a schematic view of another example of the grain 322*b* on the surface 321*b* of the shoulder portion 320*b* of one embodiment of the present disclosure. FIG. 6C is a schematic view of another example of the grain 322*c* on the surface 321*c* of the shoulder portion 320*c* of one embodiment of the present disclosure. The shape of the grains 322*a*, 322*b* and 322*c* on surfaces 321*a*, 321*b* and 321*c* of shoulder portions 320*a*, 320*b* and 320*c*, respectively, can be a straight groove, a curved groove or a round hole shown in FIGS. 6A-6C, and the shapes of the grains 322*a*, 322*b* and 322*c* also can be changed according to the actual requirement. Part of the elastic element 400 can be arranged deeply into a groove or a hole of the grain 322*a*, 322*b* and 322*c* during the founding solidification step of the elastic element 400 so as to increase the stability of combination of the elastic member 400 and the reinforcing unit 300.

Figure 7:
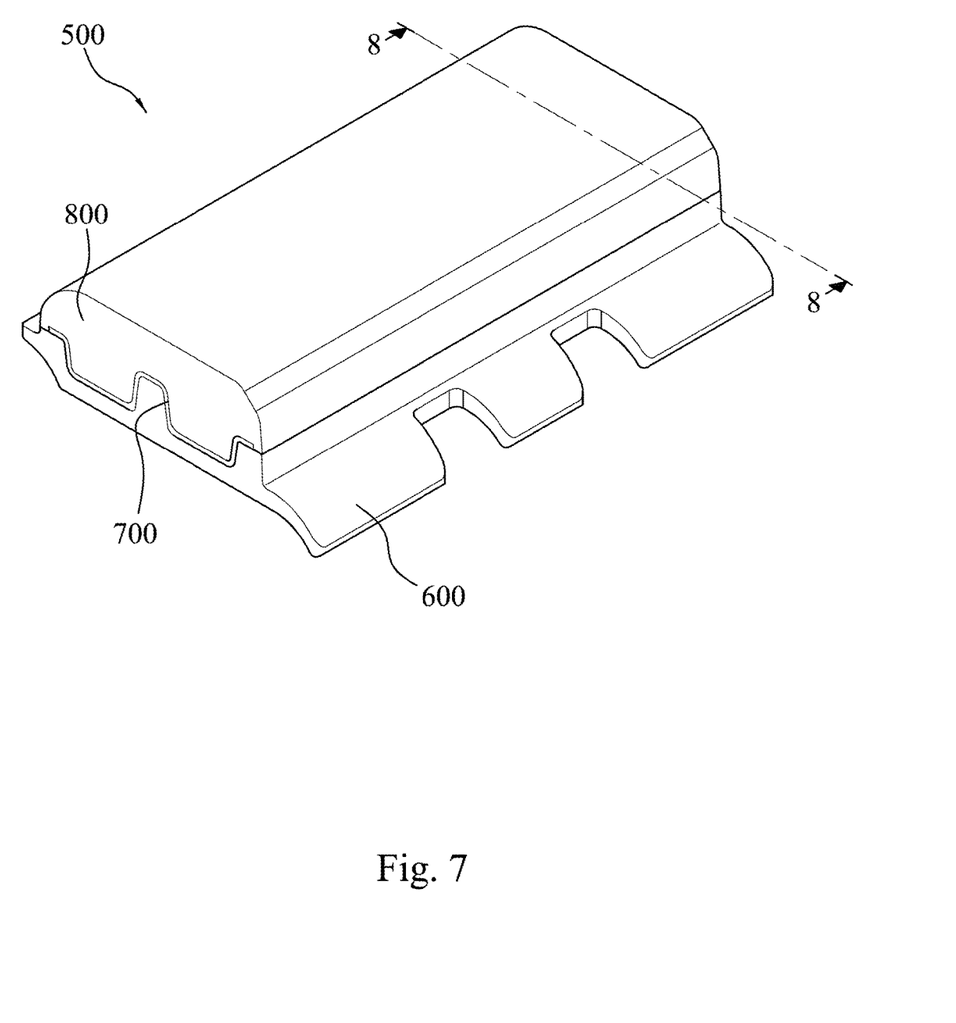
FIG. 7 is a schematic view of the track shoe pad structure assembly according to one example of another embodiment of the present disclosure.
Figure 8A:
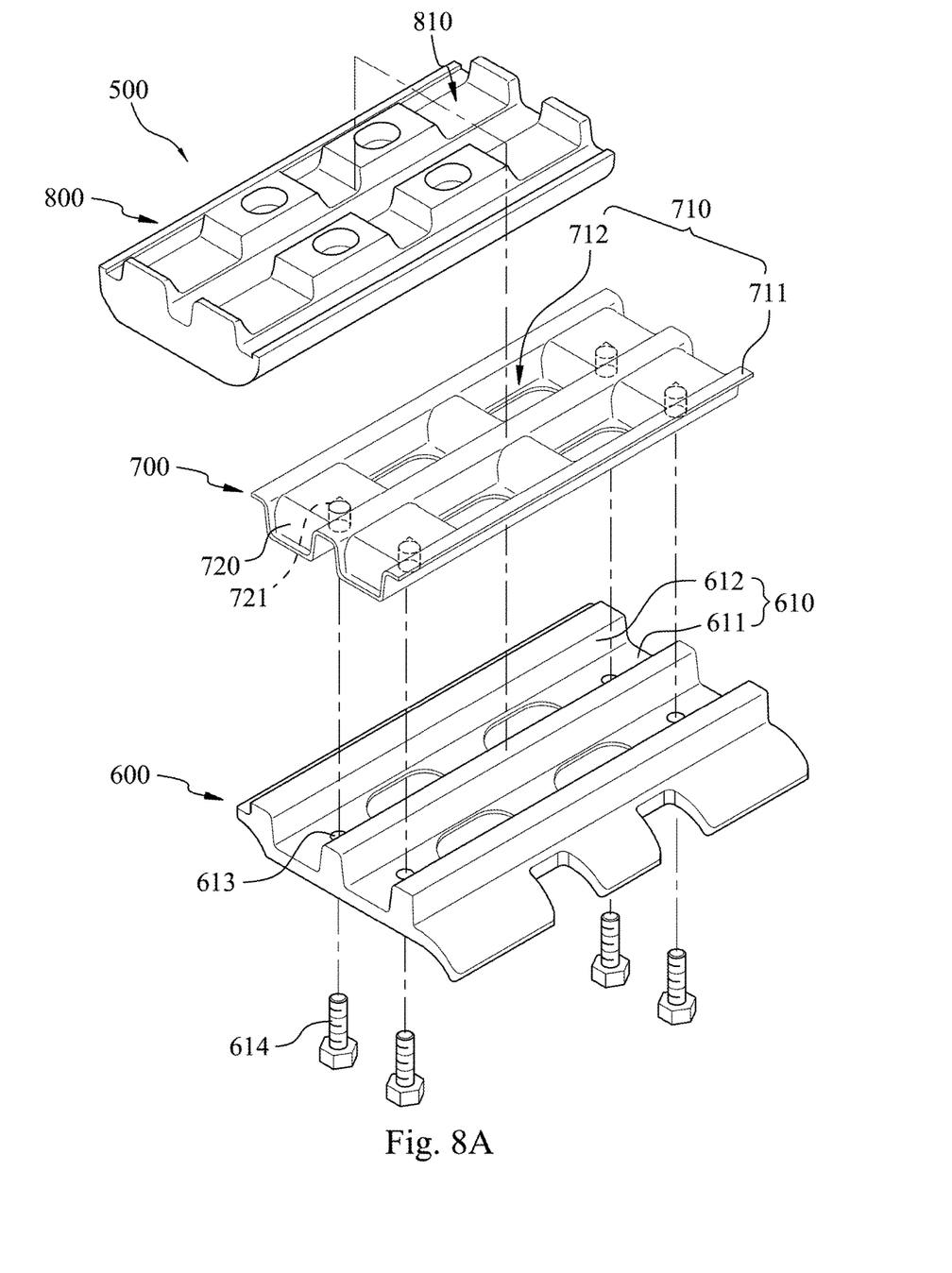
FIG. 8A is an exploded view of the track shoe pad structure assembly of FIG. 7.
Figure 8B:
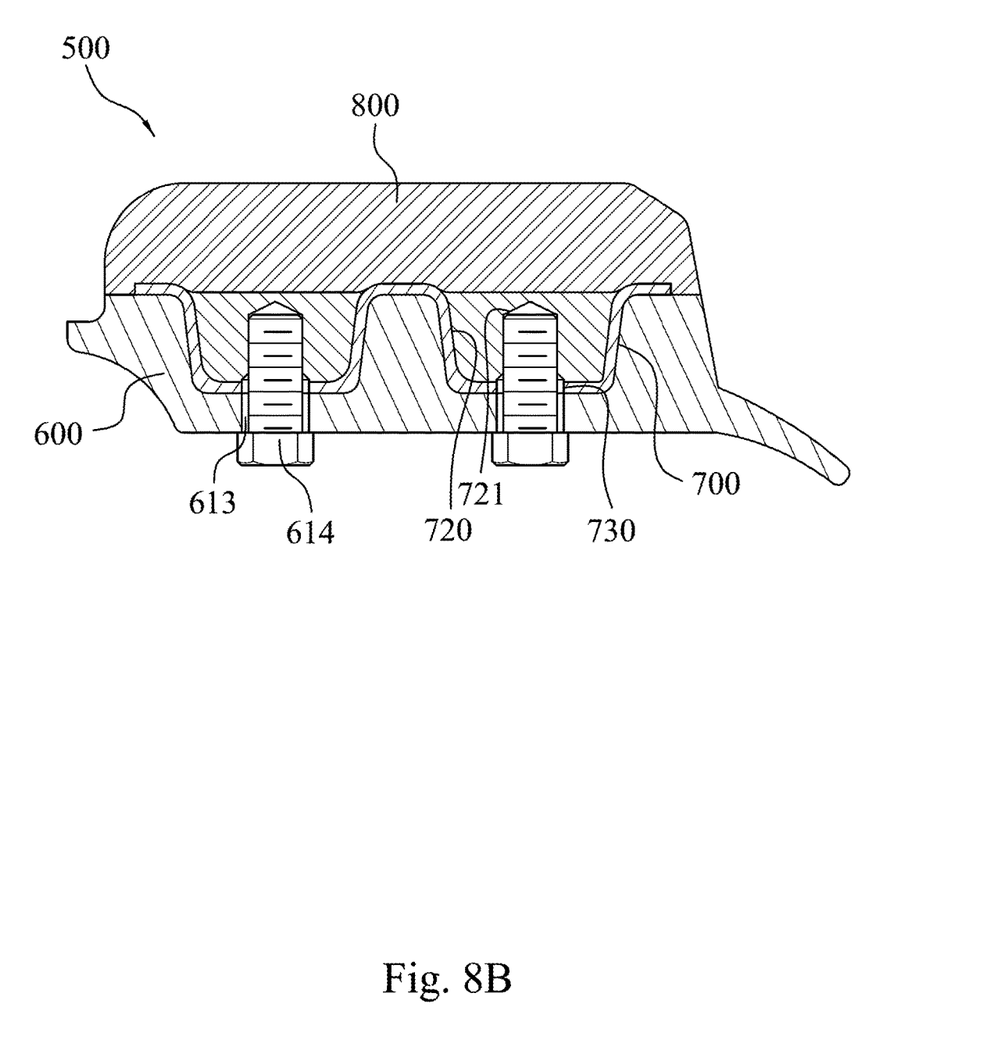
FIG. 8B is a cross-sectional view along the sectional line 8-8 of the reinforcing unit of the track shoe pad structure assembly of FIG. 7.

FIG. 7 is a schematic view of a track shoe pad structure assembly 500 of one example of another embodiment of the present disclosure. FIG. 8A is an exploded view of the track shoe pad structure assembly 500 of FIG. 7. FIG. 8B is a cross-sectional view along the sectional line 8-8 of the track shoe pad structure assembly 500 of FIG. 7.

The track shoe pad structure assembly 500 is connected to a track chain of a caterpillar vehicle by a screw member 614, wherein the track shoe pad structure assembly 500 includes a track shoe pad 600, a reinforcing unit 700 and an elastic element 800.

The track shoe pad 600 can be made of metals or other high intensity materials. The track shoe pad 600 includes at least one notch 610, wherein each of the notches 610 includes one notch bottom 611 and at least two notch walls 612. The notch walls 612 and the notch bottom 611 are integrally connected, and the two notch walls 612 are opposite to each other. The notch 610 includes at least one aperture 613 for passing the screw member 614 to connect to the track chain of the caterpillar vehicle.

The reinforcing unit 700 includes at least one base frame 710 and at least one solid member 720. The base frame 710 can be made of metals or other high intensity materials, wherein the base frame 710 includes one recessed portion 712 and two shoulder portions 711. The recessed portion 712 is correspondingly connected to the notch bottom 611 of the track shoe pad 600. The two shoulder portions 711 are opposite to each other and are integrally connected with the recessed portion 712, and the two shoulder portions 711 are against the two notch walls 612, respectively. By the foregoing corresponding relationship, the reinforcing unit 700 can be embedded to the track shoe pad 600 and so as to increase the stability of the combination of the reinforcing unit 700 and the track shoe pad 600. The solid member 720 is disposed on one side of the base frame 710 which is located away from the track shoe pad 600, and a blind screw hole 721 is disposed within the solid member 720 and the blind screw hole 721 is corresponding to the aperture 613 of the notch bottom 611 for connecting to the screw member 614. The elastic element 800 is detachably connected to one side of the reinforcing unit 700 which is located away from the track shoe pad 600, wherein the elastic element 800 includes at least one recessed trough 810 for containing the solid member 720.

The solid member 720 is welded to connect on the base frame 710, and the number of the solid members 720 is plural as well as the number of the blind screw holes 721 is also plural. Each of the blind screw holes 721 is disposed within one of the solid members 720, respectively. The base frame 710 includes at least one opening hole 730, and the opening hole 730 and the blind screw hole 721 are made by drilling after the solid member 720 welded-connecting to the base frame 710. So as to be deposed of the solid member 720 can increase the intensity of the reinforcing unit 700, and simultaneously the blind screw hole 721 can be directly disposed within the solid member 720 so as to improve the accuracy and the yield of the track shoe pad structure assembly 500.

In detail, within the track shoe pad structure assembly 500, the track shoe pad 600 can include two notches 610, wherein each of the notches 610 includes one notch bottom 611 and two notch walls 612, the base frame 710 can include two recessed portions 712, and the number of the solid member 720 is four as well as the number of the blind screw hole 721 is four, wherein two of the solid members 720 are arranged at intervals on the one recessed portion 712, and the other two of the solid members 720 are arranged at intervals on the other recessed portion 712.

Each of the recessed portions 712 of the base frame 710 is formed by stamping, and the solid member 720 includes a plurality of grains (not shown in figures). Part of the elastic element 800 can be arranged deeply into a groove or a hole of the grain on the solid member 720 so as to increase the stability of combination of the elastic member 800 and the reinforcing unit 700.

According to the aforementioned embodiments, the present disclosure has the advantages described bellowing:

First, by the reinforcing unit with supporting ribs which supports under the elastic element can effectively increase the combination intensity of the elastic element and can prevent the abrasion caused by lateral shake of the elastic element from the processing of the caterpillar vehicle.

Second, by the detachable connection of the track shoe pad and the elastic element, the track shoe pad has no need to be replaced with the elastic element, and can decrease the costs of the replacement.

Third, by the connection of reinforcing unit between the track shoe pad and the elastic element can prevent sands or stone chips entering the gap between the track shoe pad and the elastic element, and can prevent the elastic element 400 from abrading and then increase the combination intensity between the elastic element and the track shoe pad.

Fourth, by the deposing of the solid member can increase the intensity of the reinforcing unit. Moreover, because of the solid member is a solid block, the solid member can prevent the production of gas bubble during the founding solidification step of the elastic element and increase the serve life of the elastic element.

Fifth, by the drilling method to form the opening hole and the blind screw hole on the base frame and the solid member respectively can improve the accuracy of the reinforcing unit. In the same time, the location of the opening hole and the blind screw hole can be disposed according to different structure of the track shoe pad, and then the same specification of the reinforcing unit can operate in coordination with different specifications of the track shoe pad by different types of drilling and can reduce the cost of the production.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A track shoe pad structure assembly which is connected to a track chain of a caterpillar vehicle using a plurality of screw members, the track shoe pad structure assembly comprising:
   a track shoe pad comprising:
      a track shoe plate having a width and a length, and a first surface and a second surface, the track shoe plate comprising a plurality of apertures each formed through the track shoe plate to interconnect the first surface and the second surface; and
      three notch walls each extending along a length direction of the track shoe plate and protruding upward from the first surface of the track shoe plate, the notch walls being spaced apart along a width direction of the track shoe plate to thereby form two notches each between two adjacent notch walls, wherein a plurality of the apertures are positioned corresponding to each notch;
   a reinforcing unit comprising:
      a base frame disposed on the track shoe pad and formed as a plate having a plurality of bends, the base frame having a width and a length, and a first surface facing away from the track shoe pad and a second surface facing toward the track shoe pad, wherein the base frame comprises two exterior shoulder portions that extend along a length direction of the base frame and that are on opposite sides of the base frame along a width direction of the base frame, each of the exterior shoulder portions being formed by a bend away from the first surface of the base frame and a bend in the width direction of the base frame and abutting against one of the outer ones of the notch walls of the track shoe pad, wherein the base frame further comprises a center shoulder portion which extends along the length direction of the base frame, the center shoulder portion being formed by a bend away from the first surface of the base frame at a position between the two exterior shoulder portions and abutting against a center one of the notch walls of the track shoe pad, wherein a recessed portion is formed between one of the exterior shoulder portions and the center shoulder portion, and another recessed portion is formed between the other exterior shoulder portion and the center shoulder portion, wherein the base frame is formed with a plurality of opening holes which pass through the base frame and respectively correspond in position to the apertures of the track shoe plate of the track shoe pad; and
      a plurality of solid members disposed on the first surface of the base frame respectively at locations corresponding to the opening holes of the base frame, wherein a plurality of the solid members is provided in each of the recessed portions, and each of the solid members extends between and contacts one of the exterior shoulder portions and the center shoulder portion, wherein each of the solid members comprises a blind screw hole that is positioned corresponding to one of the opening holes of the base frame; and
   an elastic element detachably connected to the first surface of the base frame of the reinforcing unit, wherein the elastic element has an inner surface formed with a plurality of recessed troughs that respectively receive the solid members.

* * * * *